United States Patent [19]
Dudko et al.

[11] 3,841,923
[45] Oct. 15, 1974

[54] FLUX FOR ACCOMPLISHING WELDING-TYPE ELECTROSLAG PROCESS

[76] Inventors: Daniil Andreevich Dudko, pereulok, Mechnikova, 3, kv. 7; Nikolai Yakovlevich Scherbina, ulitsa Gorkoya, 98, kv. 15; Igor Ivanovich Suschuk-Sljusarenko, ulitsa Vyborgshova, 80/17, kv. 94; Anatoly Ivanovich Chvertko, bulvar Lesi-Ukrainki, 2, kv. 39; Viktor Mikhailovich Khrundzhe, bulvar Likhacheva, 3, kv. 72; Nikolai Konstantinovich Bizik, ulitsa Geroev-sevastopolya, all of Kiev, U.S.S.R.

[22] Filed: Dec. 18, 1972

[21] Appl. No.: 316,395

Related U.S. Application Data

[63] Continuation of Ser. No. 157,717, June 28, 1971, abandoned.

[52] U.S. Cl. .................................. 148/26, 75/94
[51] Int. Cl. ............................................ B23k 35/34
[58] Field of Search ............................ 148/22–24, 148/26; 75/94; 29/495, 496; 219/73, 146

[56] References Cited
UNITED STATES PATENTS

| | | | |
|---|---|---|---|
| 2,505,291 | 4/1950 | Lucas et al. ................... | 148/26 |
| 2,507,751 | 5/1950 | Bennett........................... | 148/26 |
| 2,671,737 | 3/1954 | Jominy et al. ................. | 148/26 X |

*Primary Examiner*—Anthony Skapars
*Attorney, Agent, or Firm*—John C. Holman

[57] ABSTRACT

A flux for accomplishing an electroslag process of the type of welding-, building-up and remelting-type, containing, per cent by weight: boron oxide — 10 to 20, potash — 15 to 20, melted borax — 10 to 20, up to 5 of cryolite, sodium fluoride being the balance.

1 Claim, No Drawings

FLUX FOR ACCOMPLISHING WELDING-TYPE ELECTROSLAG PROCESS

This is a continuation of application Ser. No. 157,717, filed June 28, 1971, now abandoned.

BACKGROUND OF THE INVENTION

The present invention relates to fluxes for accomplishing an electroslag process, such as welding, building up or remelting, where a slag bath is a source of heat.

DESCRIPTION OF PRIOR ART

The fluxes commonly used in electroslag welding of carbon and both low- and high-alloy steels ensure a stable process only at slag bath temperatures approximating 1,800° to 2,000°C. This is attributed, in the first place, to the fact that the flux components ($SiO_2$, $CaF_2$, $Al_2O_3$, CaO, MnO, etc.) have high melting and boiling points. The slag bath, which acts as a source of heat in melting both the base and filler metal, is of primary importance in terms of its influence on the quality of the weld and adjacent metal and predetermines the performance of the joint as a whole.

High temperature of the slag bath and a relatively low welding rate tend to promote not only an adequate penetration into the edges of the metal, being joined together, but a considerable overheating of the base metal adjacent to the joint.

Overheating of the metal in the zone adjacent to the weld affects the mechanical strength and is associated with, as it is known, a coarse-grained structure, inferior ductility and much lower impact toughness. To eliminate the harmful effect of overheating, preferably an expensive postweld thermal treatment is employed.

All attempts to decrease the temperature of the slag bath and, hence, an excessive heating of both the base and weld metal by reducing the current input on the welding process and using lower voltage have not hitherto proved successful with known fluxes, since in the cases under consideration stability of the electroslag process was liable to decrease abruptly causing poor penetration (fusion). The latter is indicative of not only a disturbed heat balance, but of inadequate chemical activity of the fluxes employed with the welding operation effected at a lower temperature.

It is commonly known that the slags tend to boil not at a definite temperature but in a temperature range conditioned by the boiling points of the flux ingredients. The melt temperature increases as the flux components with the lower boiling points boil away.

Higher temperatures of both the metal and slag baths lead to burning-out or evaporation of certain constituents, such as zinc. This is why such electroslag procedures as building-up, welding and remelting of the metals containing zinc, tin, lead and other low-melting elements, have limitations in their practical application due to their tendency either to evaporate or to impregnate the deposited metal with the elements present in the base metal; an instance of this is iron pick-up by the Monel metal, brass or bronzes.

Minimum overheating of both the weld metal and the affected zone and, consequently, the most favorable mechanical properties of the joint can be achieved by reducing the temperature of the slag bath to a value providing for a minimum penetration (up to a zero one) into the edges of the metal to be welded.

With zero penetration into the base metal a welded joint is performed on account of wetting the solid metal with a liquid one, the wetting being dependent on a proper selection of flux. Occasionally the filler material used during welding does not fuse with the base metal during welding (in case of zero penetration), which is indicative of inadequate activity of the slags at a low temperature of the welding process.

Chemical activity of the slag characterizes its ability to restore the oxide films on the edges being welded or to convert them by decomposing (dissolving) into easily fusible complexes which can be assimilated by the slag bath.

The use of the known slags during electroslag procedures results in the fusion of the base metal, especially in joining together the metals with different melting points, such as, steel-copper, steel-bronze, steel-brass, stainless alloy-carbon steel. Besides, there occurs the burning-out of alloying elements and the deposited metal does not exhibit the desired high mechanical properties.

SUMMARY OF THE INVENTION

It is an object of the present invention to eliminate the above drawbacks.

The invention is in essence aimed at designing a flux for accomplishing electroslag process for bonding together metals with different melting points, which would make it possible to completely preclude penetration into the base metal, ensuring, as a result, high mechanical properties of the deposited metal and eliminating the burning-out and evaporation of alloying elements in carrying out the electroslag process.

DESCRIPTION OF PREFERRED EMBODIMENTS

This object is achieved by designing a flux for performing an electroslag process of the welding-, building-up or remelting-type, the above flux being based on sodium fluoride and borax and containing, conforming to this invention, the following amounts of (per cent by weight):

boron oxide: 10–20
potash: 15–20
melted borax: 10–20, sodium fluoride being the balance.

The flux of the above composition ensures an electroslag process at a slag bath temperature lower than the melting point of the base metal. Thus, in building-up copper, bronze and/or brass on steel, the temperature of the slag bath is lower as compared to the steel melting point, by virtue of which the base metal is not fused.

It is advisable that the flux should contain up to 5 per cent by weight, of cryolite which would contribute to a reduction in aluminium burning-out rates.

To make the essence of the present invention more fully apparent, below are given the exemplary compositions of the proposed flux, conforming to the invention.

To prepare the flux its ingredients are taken in the following amounts (per cent, by weight):
boron oxide — 10 to 20, potash — 15 to 20, melted borax — 10 to 20 and the rest — sodium fluoride.

The flux is obtained by using a conventional technique accepted for fused fluxes or by mixing the ingredients mechanically with the electroslag process accomplished on the orthodox welding equipment.

In a second example according to the invention up to 5 percent by weight of cryolite may be introduced in the flux. This will contribute to reduced burning-out of zinc and aluminium.

The flux ingredients have a substantially low-melting point and feature high chemical activity.

The flux of the above composition ensures that the electroslag process is accomplished at a lower temperature of the slag bath than the melting point of the base metal. For instance, in building-up copper, bronze and brass on the steel base metal the slag bath temperature is lower than the steel melting point.

The flux of the invention has high electrical conductivity, adequate ductility, good wettability and ensures rapid and easy stabilization of the electroslag process followed by equally stable running of the process.

In joining together metals of different melting points, such as steel-copper, steel-bronze, steel-brass, stainless alloy-carbon steel, the flux of the invention makes it possible to eliminate almost completely any penetration into the base metal thereby ensuring superior mechanical properties of the deposited metal and to avoid the burning-out of the alloying elements in the course of the electroslag process.

As tests have shown, in producing such bimetals as steel-copper, steel-bronze, steel-brass by the application of a non-ferrous metal to the steel through the use of electroslag surfacing, high-quality welded joints are guaranteed both in as-deposited and as-rolled conditions. Generally, rupture is liable to occur in the deposited metal and not along the weld line. Electroslag surfacing by using the proposed flux not only practically eliminates the iron pick-up by the built-up layer, but tends to improve its mechanical properties due to the refining action of the flux. Thus, in brass building-up or remelting the tensile strength increases from 19 kg/mm (for gravity-die cast brass) to 36 kg/mm, elongation from 3.8 to 25 percent. Practically there was no zinc burning-out at all in that case.

The deposition and weld rates amounted to 2–3 m/hr at a lower power input.

For the first time in the practice of electroslag processes of welding-, building-up and/or remelting-type have been successfully brought about without penetrating into the edge being welded or built-up.

On some occasions the low-melting metals, such as brass, and bronze have been used as consumable electrodes.

What is claimed is:

1. A flux for performing an electroslag process of the types including, welding, building up and remelting, containing, in percent by weight:
   boron oxide: 10–20
   potash: 15–20
   melted borax: 10–20, up to 5 percent by weight of cryolite, and sodium fluoride being the balance.

* * * * *